(12) United States Patent
Antonello (10) Patent No.: US 7,428,784 B1
(45) Date of Patent: Sep. 30, 2008

(54) PLANER KNIFE ADJUSTMENT JIG

(76) Inventor: Bruno Antonello, 936 - 15th Ave. NE., Calgary (CA) T2E 1J1

( * ) Notice: Subject to any disclaimer, the term of this patent is extended or adjusted under 35 U.S.C. 154(b) by 0 days.

(21) Appl. No.: 11/944,480

(22) Filed: Nov. 23, 2007

(51) Int. Cl.
*B27G 23/00* (2006.01)
(52) U.S. Cl. .......................................... 33/633; 33/628
(58) Field of Classification Search .................. 33/633, 33/613, 626–628, 630–631, 645; 83/522.11, 83/522.14, 522.15, 522.16, 522.22, 522.24, 83/522.25
See application file for complete search history.

(56) References Cited

U.S. PATENT DOCUMENTS

| 1,653,048 | A |   | 12/1927 | Kelly |   |
|---|---|---|---|---|---|
| 2,496,800 | A |   | 2/1950 | Larkins |   |
| 2,589,865 | A | * | 3/1952 | Rivard | 33/633 |
| 2,747,291 | A | * | 5/1956 | Snyder | 33/633 |
| 3,200,507 | A | * | 8/1965 | Rivard | 33/633 |
| 3,206,860 | A | * | 9/1965 | Warrick | 33/633 |
| 3,337,269 | A | * | 8/1967 | Mennekes et al. | 299/34.03 |
| 3,903,609 | A | * | 9/1975 | Brown | 33/635 |
| 4,519,142 | A |   | 5/1985 | Parker |   |
| 4,819,703 | A |   | 4/1989 | Rice et al. |   |
| 4,854,051 | A |   | 8/1989 | Hessenthaler |   |
| 5,020,228 | A |   | 6/1991 | Hessenthaler |   |
| D412,511 | S | * | 8/1999 | Lefevre | D15/140 |
| 5,987,767 | A | * | 11/1999 | Roddie | 33/628 |
| 2006/0090816 | A1 | * | 5/2006 | Wixey et al. | 29/256 |

\* cited by examiner

*Primary Examiner*—Yaritza Guadalupe-McCall
(74) *Attorney, Agent, or Firm*—Sean W. Goodwin (57) ABSTRACT

A jig is provided for aligning the cutting depth of knife blades on a cylindrical rotary cutter head of a rotary planar machine. The jig has a tripod support adapted for spacing the jig radially over the cutter head. An indexing member circumferentially positions the jig with two radially adjustable knife adjustment members aligned longitudinally and radially over a knife blade. In use, the jig can be calibrated over a knife blade so that the knife blade can be removed and a replacement knife blade installed with the same radial projection along the longitudinal extend of the cutter head. Alternatively, or in addition, each of a plurality of knife blades of a cutter head can be set to the same longitudinal radial projection.

10 Claims, 6 Drawing Sheets

PRIOR ART

PLANER KNIFE ADJUSTMENT JIG

FIELD OF THE INVENTION

This invention relates to jigs and adjustment tools for setting cutting edges at a uniform cutting depth on cylindrically shaped rotary cutter heads. More particularly, this invention is related to an apparatus for aligning knife blades on woodworking rotary planers.

BACKGROUND

In the wood working industry and the like, it is a common practice to align the cutting edges of knives on planers to the knife cutter head. The cutter heads, cylindrical in shape are of various diameters, dependent on the manufacturer. Each cutter head has multiple knife blades, each knife blade aligned to the same cutting depth from the surface of the cutter head. A misaligned knife blade, one that is of a shallower cutting depth from the surface of the cutter head may do all the cutting (because its cutting edge is higher than the other cutting edges) and one that is of a deeper cutting depth from the surface may not do any cutting at all (because its cutting edge does not contact with the surface to be planed). In either event, there results in poor quality planed surfaces and uneven knife wear necessitating more frequent replacement of the cutting knives.

Further, as the cutter heads rotate at high revolutions per minute, any shift in the balance of the cylindrical cutter head may pose a danger to an operator. Correctly positioned knives provide better balance and do not create unnecessary and dangerous conditions for an operator. The smooth rotation of the cylindrical cutter head also ensures a smooth planed surface and uniform knife wear.

The cutting knives are also removed periodically for maintenance, including sharpening, and for replacement of worn cutting knives. The reinstallation of the cutting knives after maintenance or replacement is time intensive in that it is important to correctly align all cutting knives to the same cutting depth. The physical shape of the cutter head, being cylindrical, make such procedures difficult and time consuming.

U.S. Pat. No. 5,020,228 to Hessenthaler (Jun. 4, 1991) teaches a jig for aligning cutter blades to a cutter head comprising a magnetic bar adjustably suspended over a knife blade, set by screws, supported by a pair of arcuate members at substantially opposing ends of the magnetic bar. The arcuate members are pivotally supported by substantially parallel base bars that rest on the rotors. The Hessenthaler jig can be used with a variety of rotors of varying diameters due to the pivotally supported arcuate members. However, there is no mechanism to align the jig with the knife blade consistently and the base support bars do not allow for height adjustability of the jig itself.

U.S. Pat. No. 1,653,048 to Kelly (Oct. 1, 1925) teaches an arcuate jig gauge that rests on top of a rotor. It has an adjustable element that aligns on top of a knife blade and is height adjustable. However, '048 to Kelly does not teach the height adjustability to aid in positioning the jig over a knife blade, but rather to avoid debris that may be on the surface of the rotor. Further, this technology is not accommodating of varying diameters of a rotor.

U.S. Pat. No. 4,519,142 to Parker (May 28, 1985) discloses a blade height calibration device. It comprises a base member, a vertical support member and an arcuate head having an adjustable set screw. A cutter head is placed within the device, and a portion of the arcuate head rests on the cutter head, forming a space to accommodate a knife blade. This technology teaches a point of contact with the rotor by way of the vertical support member and a portion of the arcuate head. Disadvantageously, '142 to Parker cannot accommodate rotors or varying diameters, as the vertical member is in a fixed position and of a fixed size.

U.S. Pat. No. 2,496,800 to Larkins (Nov. 5, 1947) discloses a pair of apparatus that are placed at each opposing ends of a cutter head. Each apparatus disclosed is individually manipulated and supported independently on the cutter head by a member, having a cavity therein to accommodate the knife blade. The height of the member is not adjustable, and the position of the apparatus cannot be consistently aligned respecting the position of the knife blade.

Therefore, there is a need for a jig or adjustment tool that allows for quick, easy, and simple alignment of cutting knives on a planar cutting head that is height adjustable. Further the jig would permit reproducible alignment of the knife blades position relative to the rotary cutter head.

There is also a need for an adjustment jig that is capable of reproducing a consistent alignment for each knife blade on a rotary cutter head and for reproducing a consistent alignment of all the knife blades on a rotary cutter head.

There is also a need for a jig or adjustment tool that is universal for use on most available rotary cutter heads.

SUMMARY OF THE INVENTION

Embodiments of the invention provide a universal adjustment jig for aligning the cutting depth of knife blades on a cylindrical rotary cutter head. The jig is adapted to fit cutter heads of various diameters and allows for the height adjustment of the knife blades in relation to the cutter head and consistent adjustment relative to each knife blade on the same cutter head. Adjustable indexing members provide for consistent lateral alignment respecting the position of the knife blades.

A tripod jig for the adjustment of knife blades on a rotary cutter head, comprises two adjustable clearance members for alignment of the cutting depth of the knife blades.

In a broad aspect of the invention, a jig for setting the radial projection of a knife blade extending radially from a rotary cutter head of a rotary planer, the rotary cutter head having a longitudinal axis, the jig comprises an elongate body having a longitudinal axis, three clearance members extending from below the body and adapted for engaging the cutter head to provide a stable tripod support spaced radially, indexing members extending from below the body and adapted for engaging the rotary cutter head at two points of contact substantially spaced apart, for orienting the axis of the body along the longitudinal axis of the cutter head and two knife elevation adjustment members spaced along the axis of the body and radially adjustable below the body wherein the indexing members orients the two knife elevation adjustment members radially over the knife blade and the two knife elevation adjustment members are radially adjusted so as to engage the knife blades for setting the radial projection of the knife blades.

In another broad aspect, the jig enables a method for providing consistent and repetitive adjustment of knife blades comprising positioning the jig with the clearance members engaging the rotary cutter head, adjusting the jig such that the at least one indexing member abuts against the knife assembly, and adjusting the knife elevations adjustment members to engage the knife blade.

Once the jig is calibrated for alignment of a cutting knife for a particular planar cutting head, the jig can accurately and consistently reproduce the alignment for every other knife blade on that particular rotary cutter head. Further, the jig is also accurate in consistently reproducing the same alignment after each repeated use of the particular rotary cutter head.

DETAILED DESCRIPTION OF THE PREFERRED EMBODIMENT

Figure 1:
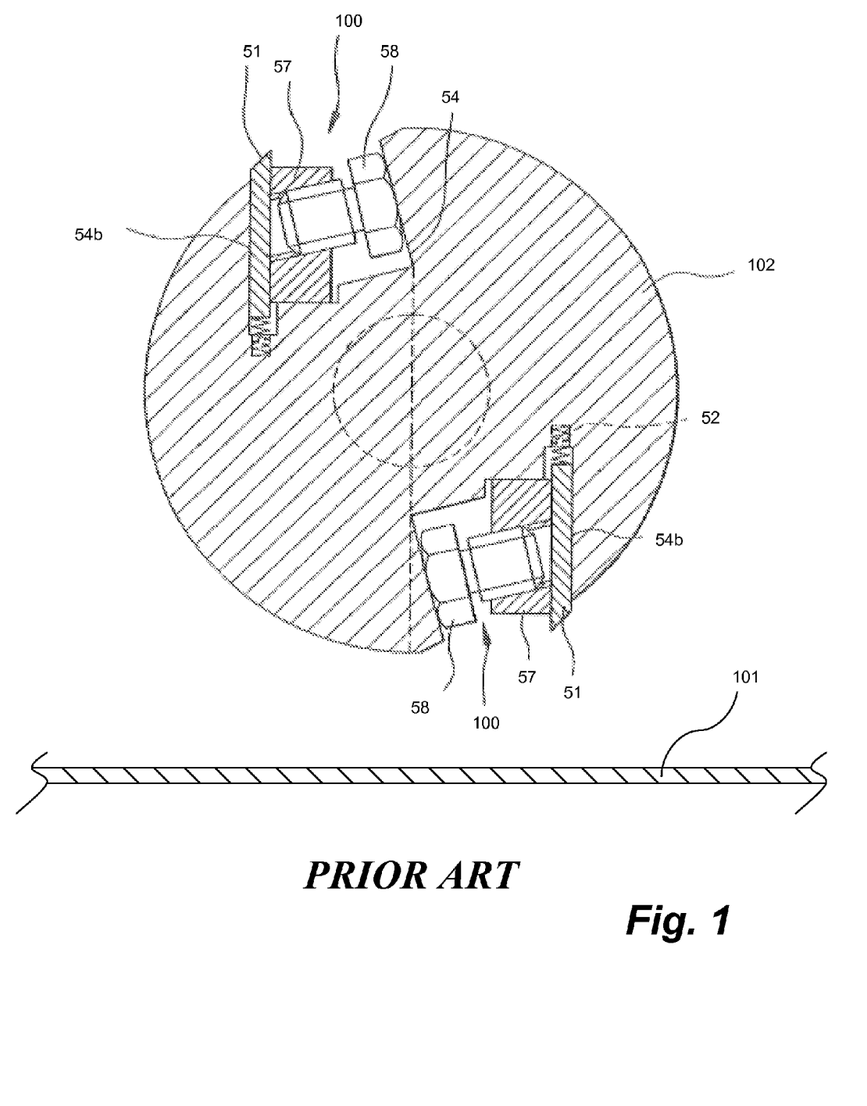
FIG. 1 is a cross-sectional view of a conventional rotary cutter head showing a plurality of knife assemblies.
Figure 2:
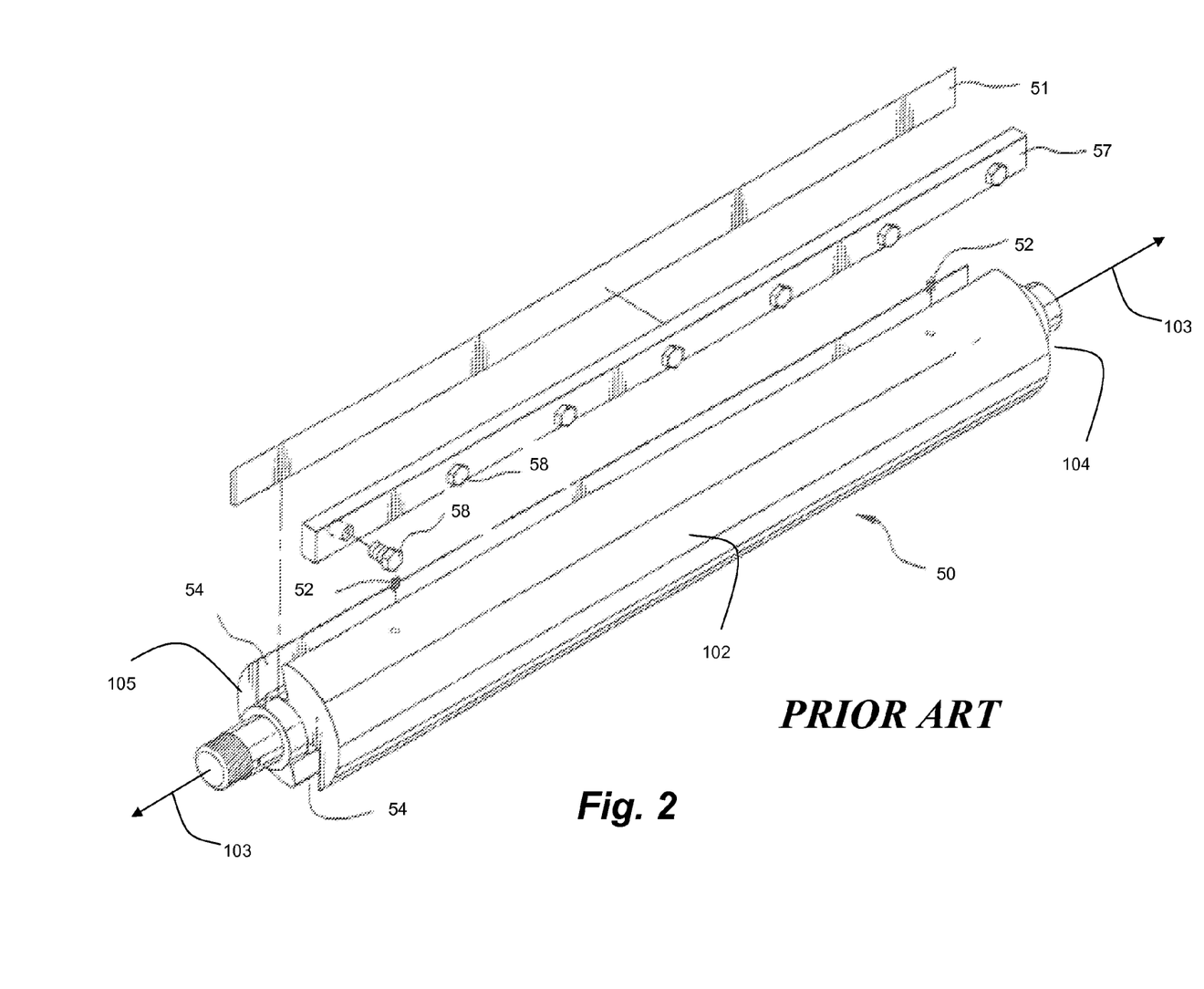
FIG. 2 is a perspective view of a conventional cutter head illustrating an elongated cylinder having a longitudinal axis, elongate knife blade and knife locking bar with screws.

With reference to FIGS. 1 and 2, a typical prior art rotary planer, as shown in U.S. Pat. No. 7,100,649 to Liu, comprises a cutter head 50 arranged to project through a table 101 for planing materials such as wood. The cutter head 50 comprises a cylindrical rotor body 102 having a longitudinal axis 103 and one or more knife assemblies 100, spaced circumferentially about the rotor body 102. A typical knife assembly 100 comprises a knife blade 51 secured within the rotor body 102 for fixing the knife blade 51 with a specified radial projection longitudinally along the rotor body 102. Biasing and jamming bolts 58 and plates 57 are provided to adjust and lock the knife blade's radial projection along the longitudinal axis 103 of the rotor body 102.

As can be seen in FIG. 2, for knife blades 51 having a linear profile (a straight cutting edge), the radial projection of the knife blade 51 at a first longitudinal end 104 of the rotor body 102 can be more, the same, or less than the radial projection at a second longitudinal end 105. If the longitudinal axis 103 of the cutter head 50 is parallel to the table 101, then the rotary planer will plane material parallel to the table 101. Further, if the knife blade or blades are not parallel to the table, or of one knife blade of two or more blades is adjusted differently than another, then operability is compromised.

Figure 3:
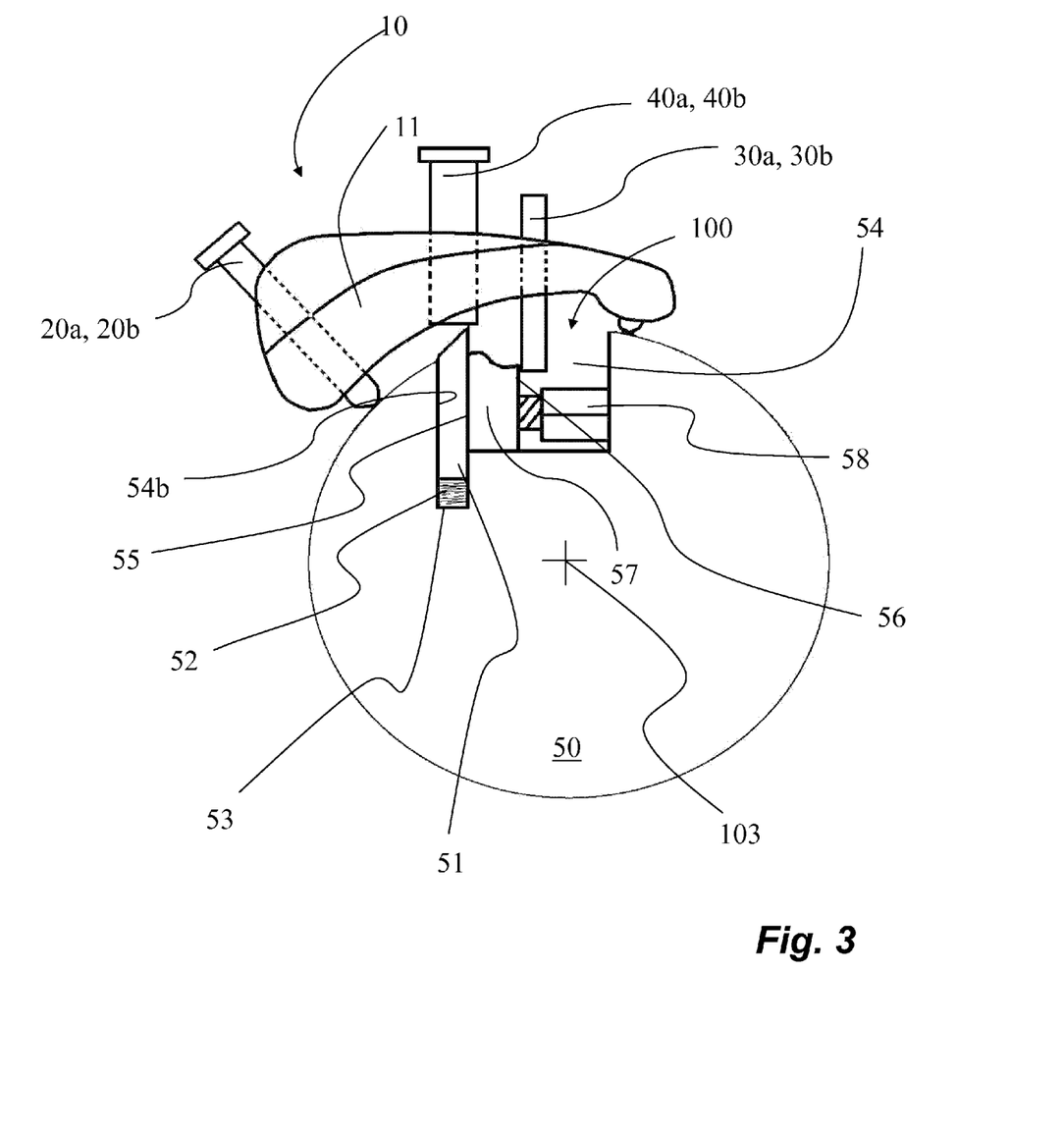
FIG. 3 is a an end view of one embodiment of the present invention in which only one knife assembly of one or more knife assemblies is shown for simplicity.
Figure 4:
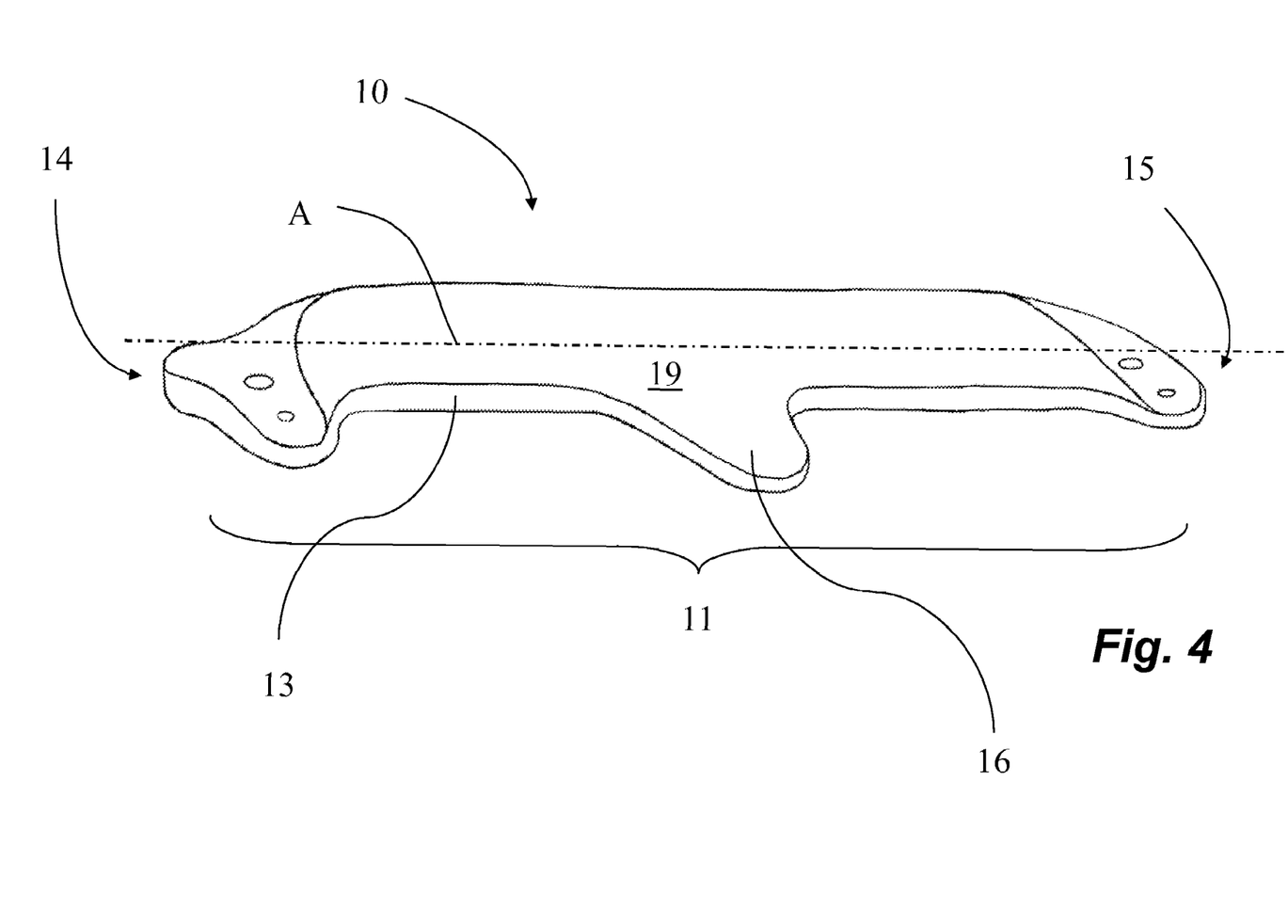
FIG. 4 is a perspective view of one embodiment of the present invention as it would be adapted for engaging a cutter head of a rotary planar.

Accordingly, with reference to FIGS. 3 and 4, in one embodiment of the invention, a planar knife adjustment jig 10 is provided for enabling consistent adjustment and setting of the radial projection of one or more of the knife blades 51 of the cutting-head 50. One knife blade 51 can be set to a particular radial projection relative to the table 101 and two or more knife blades 51, 51 . . . can be set to a consistent radial projection relative to each other.

More specifically, each knife assembly 100 of one or more knife assemblies comprises a cutting blade housed within an elongated, longitudinally extending knife well 54, supported against and substantially parallel to a longitudinally extending retaining wall 54b. Each knife blade 51 is biased substantially radially outwardly by springs 52 located in an elongated spring well 53 along the bottom of the knife well 54. The knife blade 51 is circumferentially and positionally sandwiched against the retaining wall 54b by a front face 55 of a knife locking bar 57.

The knife locking bar 57 is forced into a knife locking position by jamming or knife locking screws 58 in the knife well 54 and acting between a back side 56 of the knife locking bar and the rotary body 102. The knife locking bar 57 and knife locking screw 58 are located within the knife well 54.

The jig 10 is adapted to be radially spaced and supported by the rotor body 102 for enabling adjustment of the knife blades 51 relative thereto. The jig 10 is fit with various means of adjustment which enables adjustment of the jig body 11 radially relative to the rotor body 102 and circumferentially relative to the knife blade 51.

Figures 5A, 5B:
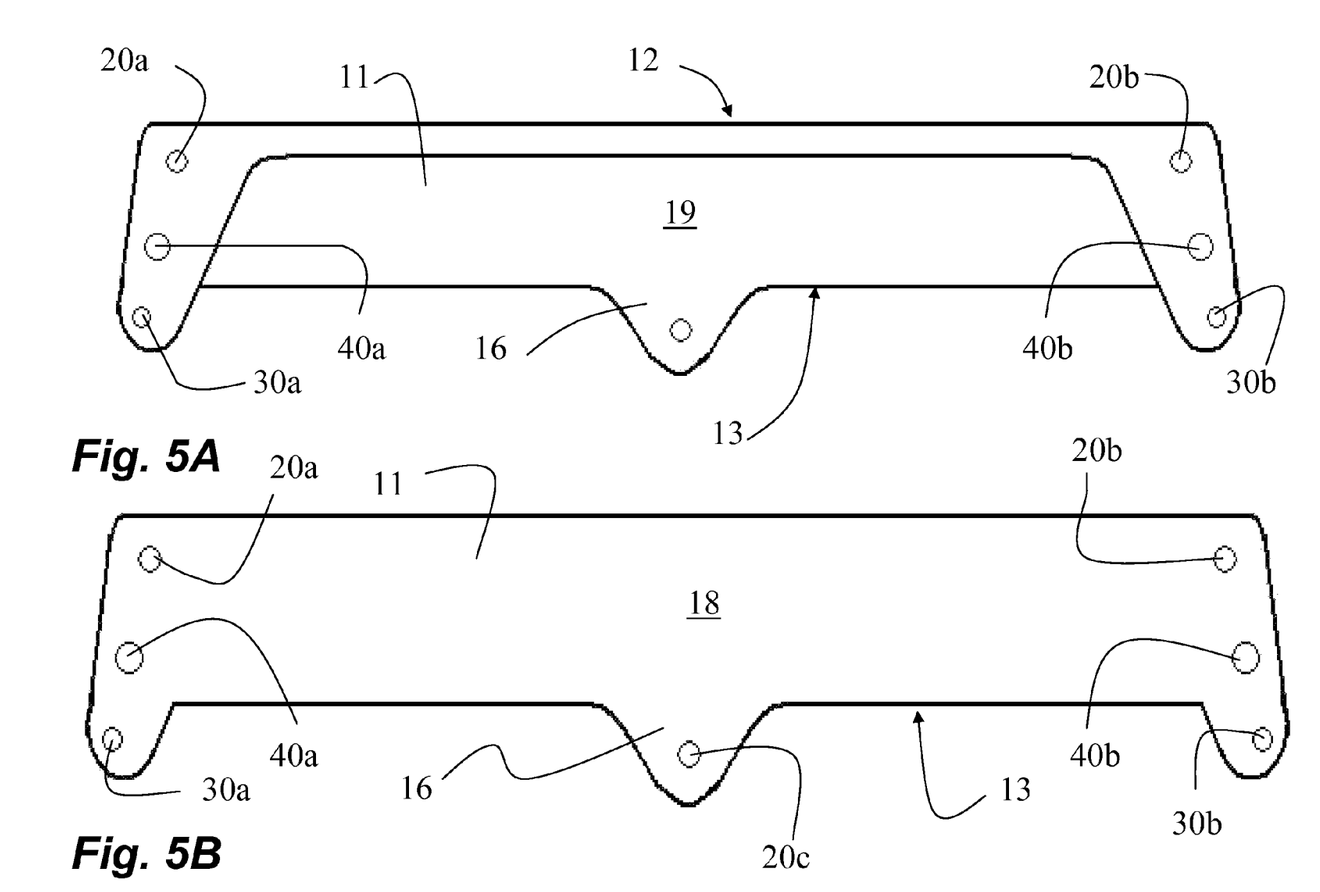
FIG. 5A is a top view of one embodiment of the present invention, illustrating the location of the clearance members, indexing members and knife adjustment screws in longitudinal and circumferential relation to one another.
FIG. 5B is a bottom view perspective of the embodiment according to FIG. 5B.

With reference also to FIGS. 4, 5A and 5B, the jig 10 comprises an elongated body 11 having a longitudinal axis A for alignment substantially parallel to the rotor body axis 103. The jig's elongated body 11 has a leading edge 12 and a trailing edge 13, with two lateral opposing ends 14, 15 corresponding generally with the first and second longitudinal ends 104, 105 of the rotor body 102. A circumferentially protruding member 16 extends from the trailing edge 13 at an intermediate point between the opposing ends 14, 15 such as a point equidistant therebetween.

Best seen in FIG. 3, one embodiment of the jig further comprises three radial clearance members 20a, 20b, 20c, two circumferential indexing members 30a, 30b, and two knife radial adjustment screws 40a, 40b. The three clearance members 20a, 20b, 20c extend substantially radially from the body 11 and provide three points of contact between the jig body 11 and the cutter head 50. The first and second radial clearance points 20a, 20b are spaced from each other and substantially along axis A for longitudinal radial adjustment of the jig body 11 form the rotor body 102. As shown in FIGS. 5A and 5B, the third clearance member 20c is offset circumferentially and positioned intermediate therebetween. The first and second radial clearance member 20a, 20b can be located in the opposing ends 14, 15 of the body 11 respectively. The third clearance member 20c can be located in the protruding member 16.

The three clearance member create a stable tripod support base for engaging the cutter head 50 and providing radial clearance between the jig 10 and the rotor body 102.

The first and second clearance member 20a, 20b are adjustable for generally setting the jig's radial clearance at each of the first and second longitudinal ends 104, 105. Each clearance member 20a, 20b is individually adjustable relative to the jig body 11, such as being threaded through the jig body 11, accessible from a top surface 17 and extending through the body 11 to a bottom surface 18. The clearance members 20a, 20b can have comparable length which is sufficient to be accessible from the top surface 17 and extend below and beyond the bottom surface 18 of the jig 10 for engagement with the rotary cutter head 50. Each clearance member 20a, 20b can be graduated to allow the user to accurately adjust each member 20a, 20b so that the pins 20a, 20b may provide radial height adjustment of the body 11 relative to the cutter head 50. The clearance members 20a, 20b can be similarly graduated to permit the radial clearance of the jig's body 11 at each of the ends 104, 105 to be identical.

The third clearance member 20c is not necessarily adjustable and therefore need not extend through to the top surface 17 of the jig but does extend sufficiently below the bottom surface 18 to provide a point contact with the rotor body 50. The third clearance member is spaced sufficiently form the first and second clearance members to engage rotor body 102 circumferentially either side of the knife assembly 100.

Figure 6:
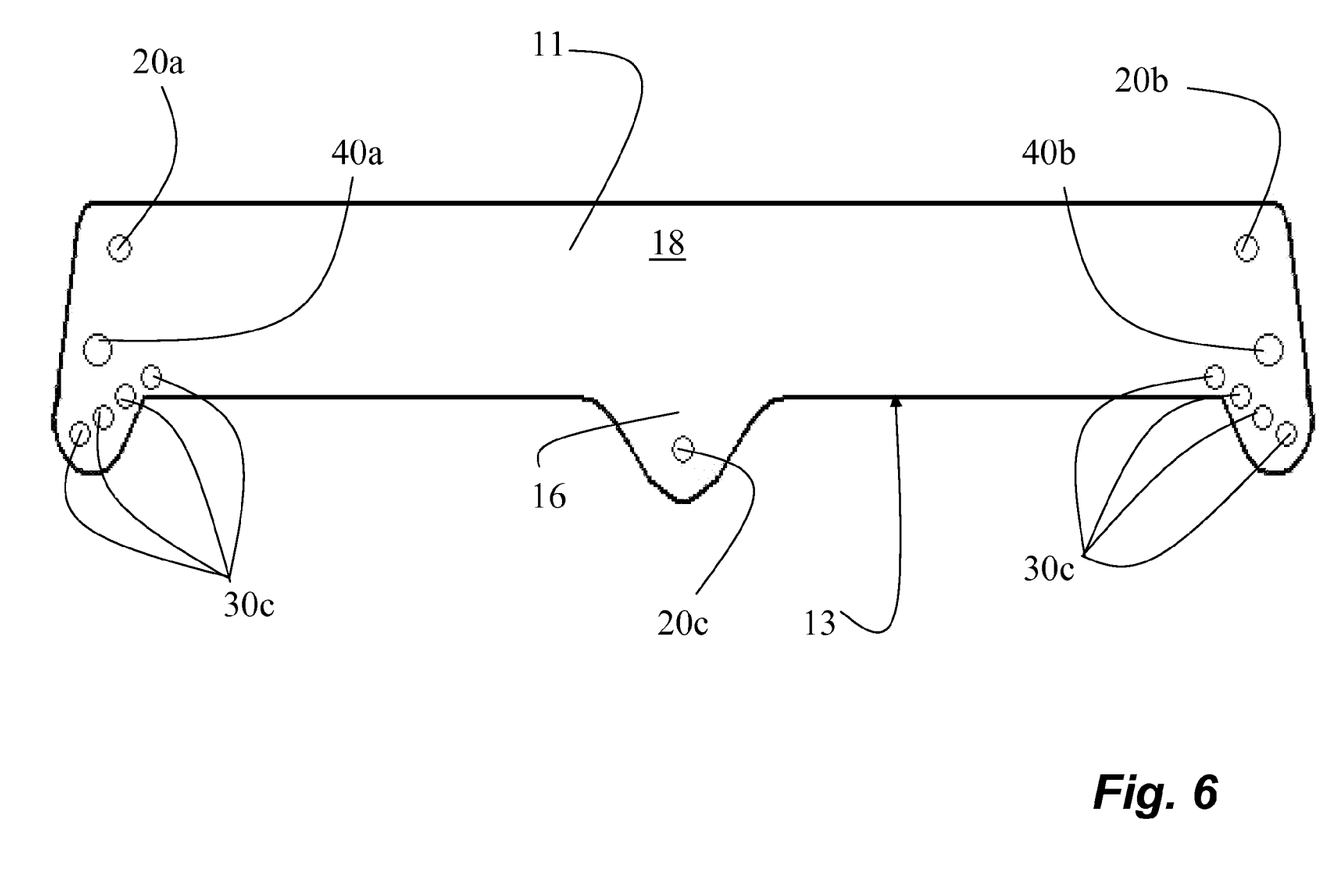
FIG. 6 is a bottom view of another embodiment of the present invention showing multiple placement locations for the indexing members.

With reference to FIG. 6, an alternative embodiment shows the jig body with multiple placement locations 30c, 30c, 30c, 30c, for the indexing members. The multiple placement locations 30c . . . allow the operator to change the placement of the indexing members 30a, 30b to adjust for the differences in the distance between the knife blade 51 and back side 56 of the knife locking bar 57 from various manufacturers.

The knife elevation adjustment screws 40a, 40b are spaced longitudinally and located adjacent the opposing lateral ends 14, 15 and spaced circumferentially sufficiently from the clearance members 20a, 20b so that the clearance members can engage the rotor body 102 and the knife elevation adjustment screws 40a, 40b are positioned generally above the knife blade 51.

In an alternative embodiment, the knife elevation adjustment screws 40a, 40b, may be magnetized to engage the knife blades 51 for use on rotary cutter heads that do not have springs 52 to radially outwardly bias the knife blade 51.

At least one indexing member engages the rotary cutter head at two points of contact. In an embodiment, and, as shown in FIGS. 3, 5A, 5B, and 6, two indexing members 30a, 30b are also positioned at about the opposing lateral ends 14, 15 and spaced adjacent the trailing edge 13 of the body 11 spaced circumferentially sufficiently from the clearance members 20a, 20b to circumferentially straddle the knife elevation adjustment screws 40a, 40b. Each indexing member 30a, 30b is individually adjustable, such as being threaded through the jig body 11, extending out of the top surface 17 and through the bottom surface 18 to engage a portion of the knife assembly 100 relative to the knife blade 51. The indexing members 30a, 30b contact the knife assembly 100 so that the knife elevation adjustment screws 40a, 40b are positioned radially over the knife blade 51. The indexing members provide two circumferential points of reference, or points of contact, relative to the cutter head 50.

In one embodiment shown in FIG. 3, the indexing members 30a, 30b abut against the back side 56 of the knife locking bar 57 of the knife assembly 100, providing two consistent lateral points of contact for alignment during radial height adjustment of the knife blade 51.

The knife elevation adjustment screws 40a, 40b are located adjacent the opposing lateral ends 14, 15 in between the clearance members 20a, 20b and the indexing members 30a, 30b respectively. Each knife elevation adjustment screw 40a, 40b is graduated to ensure accurate cutting depth measurement by the operator. The screws 40a, 40b are of sufficient length to be assessable from above the top surface 17 of the jig 10 and extend below the bottom surface 18. The top portion of each screw 40a, 40b can be fit with a dial indicator 41a, 41b which aid in the relative indexing and individual adjustment of the screws 40a, 40b.

With reference again to FIG. 3, in one typical operation, an operator could set or calibrate the jig 10 to a selected knife blade 51 of one or more knife assemblies to simplify knife removal, sharpening and replacement task or to ensure consistency in the radial projection of each of a plurality of knife blades 51. Both knife elevation screws 40a, 40b can be backed off radially, such as until they are flush with the bottom surface 18 of the jig body 11. The jig 10 is positioned over the cutter head 50 with clearance member 20c providing the trailing edge height adjustment. Indexing members 30a, 30b are adjusted as necessary to abut against the knife assembly 100, such as the knife blade 51 itself or back side 56 of the knife locking bar 57. The indexing members 30a, 30b align the longitudinal axis A of the body 11 along the axis 103 of the rotor body 102. Using clearance members 20a, 20b the operator adjusts the height of the leading edge 12 of the jig 10 such that the jig 10 is spaced from the knife 50 and generally parallel thereto. After height adjustment of the leading edge 12, there should be three points of contact between the jig 10 and the rotary cutter head.

Ensuring that the spaced indexing members 30a, 30b are in firm and constant contact with the back side 56 of the knife locking bar 57, the operator may adjust the knife elevation screws 40a, 40b such that the screws 40a, 40b are just touching the top portion of the knife blade 51.

The jig is now calibrated to a selected knife blade and can be moved to each knife blade in turn to ensure consistency therebetween or for assisting with the removal and installation of replacement knife blades, in accordance to the manufacturer's instructions.

After a replacement knife blade 51 is installed or for another of a plurality of knife blades, the calibrated jig 10 is placed radially over the blade 51. Ensuring that the indexing members 30a, 30b are firmly positioned against the back side 56 of the knife locking bar 57, the knife blade 51 height within the cutter head 50 is manually adjusted such that the top of the knife blade 51 is in physical contact with the bottom of the knife adjustment screws 40a, 40b. This operation sets the cutting edge of the knife blade 51 to the same radial positioning as the earlier knife blade. If an old knife blade 51, which is being replaced, was significantly worn, one may wish to set the new knife blade 51 with a slightly greater radial projection by adjusting both of the knife adjustment screws 40a, 40b radially outward a known amount from the calibrated position.

While maintaining the knife height adjustment, the operator would tighten the knife locking screw 58 to ensure sufficient force against the knife blade 51 to lock it in place and prevent it from being shifted during operation of the rotary planar.

The operation can be repeated for each replacement blade 51 in turn, removing and replacing a knife blade 51 with the calibrated jig 10.

The previous operation sets the cutting edge of the replacement knife 51 to the same radial positioning as the old knife. If the old knife blade was significantly worn, one may wish to set the replacement knife blade 51 with a slightly greater radial projection by adjusting both of the knife adjustment screws 40a, 40b a known radial amount from the calibrated position.

Alternatively, if there was a concern about mis-aligned blades, a single calibration can be applied for a plurality of blades for a given rotor body 102. Each knife blade 51 is thereby set to a consistent and same radial projection relative to the longitudinal position along the rotor body 102.

In some rare occasions, a table 101 may be mis-aligned from the rotor axis 103. Accordingly a blade 51 can be set with a varying radial projection along the rotor axis 103 so as to be aligned parallel to the mis-aligned table 101. The jig 10 can then be used to set each knife blade 51 to a consistent and varying radial projection relative to the longitudinal position along the rotor body 102.

For handling comfort by the user of the jig 10, the leading edge 12 can be thicker at the leading edge 12 and becomes thinner approaching the trailing edge 13, as shown in FIG. 3 and with the optional profile of the body 11 shown in FIG. 6.

As shown in FIGS. 3 through 5B, the top surface 17 of the jig 10 has an optional concave region 19 which may be used as a finger rest when using the jig 10.

Where the jig 10 is used repeatedly for the same rotary planer, the rotor body 102 and the knife assemblies 100 remain consistent and the two indexing members 30a and 30b would be rarely altered once adjusted. Therefore, alternatively, the two indexing members 30a and 30b could optionally comprise at least one indexing member which extends sufficiently along the jig body 11 to align the first and second clearance members 20a, 20b over the knife blade 51. Such a clearance member could comprise one or more non-adjustable radial projections or a longitudinally extending bar.

The embodiments of the invention for which an exclusive property or privilege is claimed are defined as follows:

1. A jig for setting the radial projection of a knife blade extending radially from a knife assembly of a rotary cutter head of a rotary planer, the rotary cutter head having a longitudinal axis, the jig comprising:
    an elongate body having a longitudinal axis;
    three clearance members extending below the body and adapted for engaging the rotary cutter head for providing a stable tripod support spaced radially therefrom;
    at least one indexing member extending from below the body and adapted for engaging the rotary cutter head at two points of contact, for orienting the axis of the body along the axis of the rotary cutter head; and
    two knife elevation adjustment members spaced along the axis of the body and radially adjustable below the body, wherein
    the at least one indexing member orients the two knife elevation adjustment members radially over the knife blade, and
    the two knife elevation adjustment members are radially adjusted so as to engage the knife blade for setting the radial projection of the knife blade.

2. The jig of claim 1 wherein each of the two knife elevation adjustment members is a threaded adjustable screw of sufficient length to extend through and below the body so as to engage the knife blade.

3. The jig of claim 1, wherein the two knife elevation adjustment members are located at opposing longitudinal ends of the body.

4. The jig of claim 1, wherein at least two of the three clearance members are first and second clearance members, each being threaded and individually adjustable screws of sufficient length to extend through and below the body, the first and second clearance members being spaced longitudinally and located at opposing longitudinal ends of the body.

5. The jig of claim 1, wherein a third clearance member is a pin of a fixed height extending below the body and spaced circumferentially from the first and second clearance members.

6. The jig of claim 1, wherein the at least one indexing member further comprises two indexing members spaced longitudinally from each other and extending through and below the body so as to provide the two points of contact to engage the cutter head and orient the two knife elevation adjustment members longitudinally and radially over the knife blade.

7. The jig of claim 1, wherein the cutter head comprises a knife and a knife locking bar and wherein the at least one indexing member of the jig is adapted to engage the knife locking bar.

8. A method for calibrating the jig of claim 1, to adjust a single knife blade, the method comprising the steps of:
    positioning the jig with the clearance members engaging the rotary cutter head;
    adjusting the jig such that the at least one indexing member abuts against the knife assembly and orients the axis of the body along the axis of the rotary cutter head; and
    adjusting the knife elevation adjustment members to engage the knife blade.

9. The method of claim 8 wherein positioning the jig further comprises radially adjusting the knife elevation adjustment members for providing clearance between the knife blade and the knife adjustment members.

10. A method of using the jig of claim 1, to adjust a plurality of the knife blades, the method comprising the steps of:
    calibrating the jig, wherein calibrating the jig further comprises:
        positioning the jig with the clearance members engaging the rotary cutter head;
        adjusting the jig such that the at least one indexing member abuts against the knife assembly and orients the axis of the body along the axis of the rotary cutter head; and
        adjusting the knife elevations adjustment members to engage the selected knife blade;
    removing the plurality of knife blades from the knife assembly;
    installing a plurality of replacement knife blades into the knife assembly;
    for each replacement knife blade, adjusting the cutting depth of the replacement knife blade within the knife assembly using the calibrated jig, wherein adjusting further comprises:
        positioning the jig with the clearance members engaging the rotary cutter head;
        adjusting the jig such that the at least one indexing member abuts against the replacement knife assembly and orients the axis of the body along the axis of the rotary cutter head;
        adjusting the cutting depth of the replacement knife blade to the knife adjustment members; and
        securing the replacement knife blade in its proper location; and
    repeating the adjusting for each replacement knife blade of the knife assembly.

* * * * *